United States Patent [19]
Mulder et al.

[11] Patent Number: 5,518,618
[45] Date of Patent: May 21, 1996

[54] SYSTEM AND PROCESS FOR PURIFYING WASTE WATER WHICH CONTAINS NITROGENOUS COMPOUNDS

[75] Inventors: Ronald Mulder, Alkmaar; Sjoerd H. J. Vellinga, Tjalleberd, both of Netherlands

[73] Assignee: Paques B.V., Balk, Netherlands

[21] Appl. No.: 351,426

[22] PCT Filed: Jun. 10, 1993

[86] PCT No.: PCT/NL93/00125

§ 371 Date: Dec. 12, 1994

§ 102(e) Date: Dec. 12, 1994

[87] PCT Pub. No.: WO93/25485

PCT Pub. Date: Dec. 23, 1993

[30]  Foreign Application Priority Data

Jun. 10, 1992 [NL] Netherlands ............ 9201026
Sep. 30, 1992 [NL] Netherlands ............ 9201693

[51] Int. Cl.$^6$ .................. C02F 3/22; C02F 3/30
[52] U.S. Cl. .......... 210/605; 210/622; 210/623; 210/629; 210/630; 210/151; 210/188; 210/195.3; 210/202; 210/218; 210/256; 210/258
[58] Field of Search ............ 210/605, 622, 210/623, 629, 630, 903, 150, 151, 202, 220, 202, 258, 259, 188, 195.3, 218, 221.2

[56]  References Cited

U.S. PATENT DOCUMENTS

| | | | |
|---|---|---|---|
| 3,186,939 | 6/1965 | Murray | 210/630 |
| 3,807,563 | 4/1974 | Reid, Jr. | |
| 3,979,293 | 9/1976 | Boulenger | 210/151 |
| 4,100,071 | 7/1978 | Beurer et al. | 210/218 |
| 4,136,023 | 1/1979 | Kirk et al. | 210/629 |
| 4,374,730 | 2/1983 | Braha et al. | 210/630 |
| 4,425,231 | 1/1984 | Fujimoto et al. | 210/605 |
| 4,618,418 | 10/1986 | Heijnen et al. | 210/218 |
| 4,948,510 | 8/1990 | Todd et al. | 210/605 |
| 5,122,287 | 6/1992 | Hsiung | 210/275 |

FOREIGN PATENT DOCUMENTS

| | | | |
|---|---|---|---|
| 0024758 | 11/1984 | European Pat. Off. | |
| 0028846 | 12/1987 | European Pat. Off. | |
| 0268225 | 5/1988 | European Pat. Off. | |
| 0325337 | 7/1989 | European Pat. Off. | |
| 8908617 | 9/1989 | European Pat. Off. | 210/605 |
| 0399380 | 11/1990 | European Pat. Off. | |
| 4-284896 | 10/1992 | Japan | 210/150 |
| 4-326989 | 11/1992 | Japan | 210/629 |

*Primary Examiner*—Peter A. Hruskoci
*Assistant Examiner*—Theodore M. Green
*Attorney, Agent, or Firm*—Young & Thompson

[57]  ABSTRACT

A system for purifying nitrogenous waste water by biological nitrification and denitrification, comprises at least two essentially separated reactor chambers, a liquid supply (4) and a liquid discharge (5). The first, aerated reactor chamber (1) is provided at the top with an overflow to the second, oxygen-depleted reactor chamber (2). The oxygen-depleted reactor chamber (2) is divided at the top into a degassing chamber (7) and a settling chamber (8) having an overflow (9) to the liquid discharge. The first reactor chamber is provided with an air supply (11, 18) and an air discharge (12) located above the supply. The first reactor chamber may be partly divided into a riser (14) and a downcomer (15) which allow, as a result of the air supply, mass circulation to take place in the aerated reactor chamber. According to the process, waste water with bacterial sludge on a carrier circulates alternately through the oxygen-depleted and the aerated reactor chambers, whereafter it is separated from the sludge and the sludge is returned to the reactor.

10 Claims, 2 Drawing Sheets

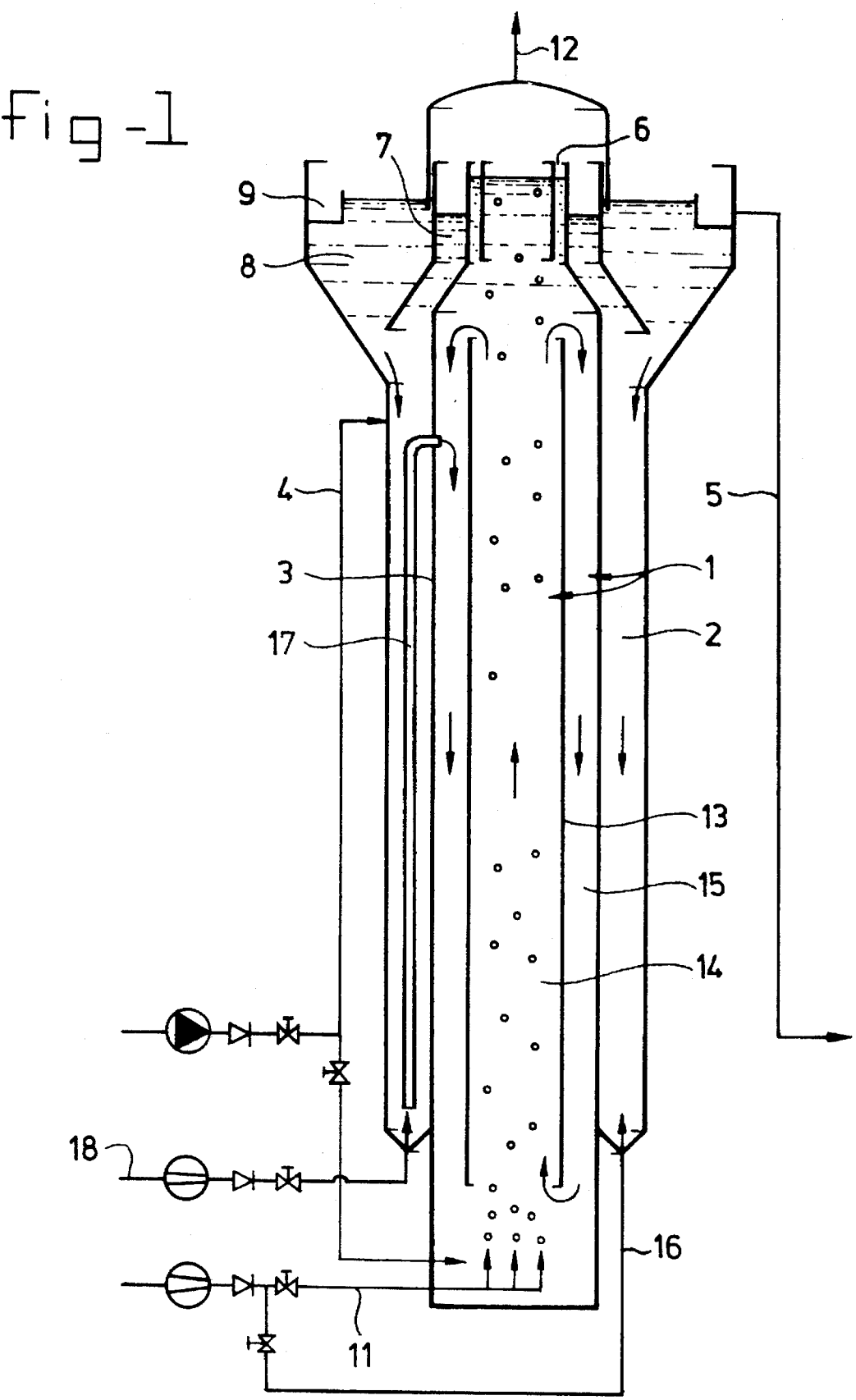

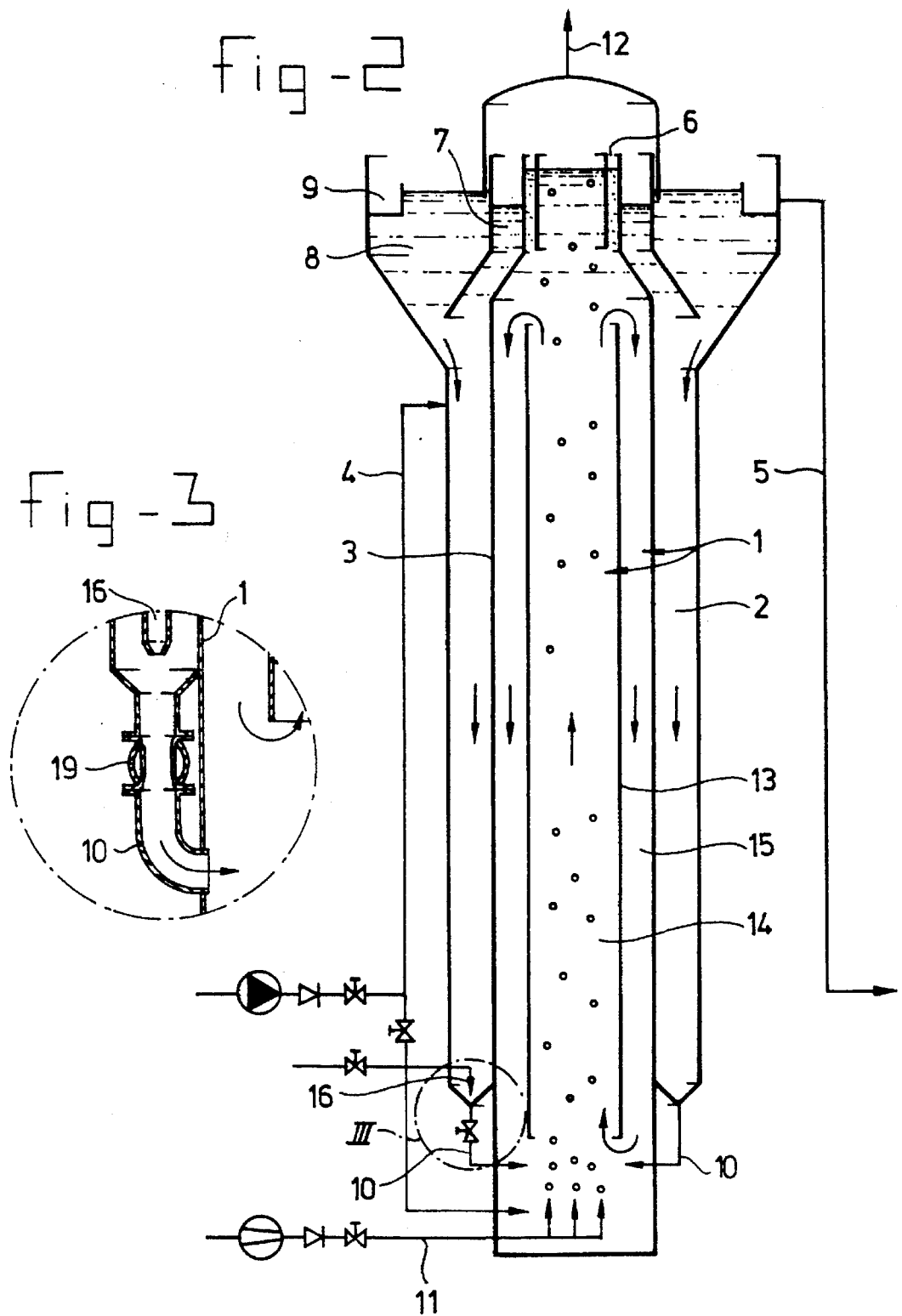

SYSTEM AND PROCESS FOR PURIFYING WASTE WATER WHICH CONTAINS NITROGENOUS COMPOUNDS

FIELD OF THE INVENTION

The invention addresses the field of waste water purification. More particularly, the invention relates to a system for purifying waste water, which comprises at least two reactor chambers separated by a vertical wall, a liquid supply and a liquid discharge, wherein nitrogenous waste water is nitrified and denitrified, and to a process for purifying nitrogenous waste water, the water being treated with microorganisms alternately in an oxygen-depleted chamber and an oxygen-rich chamber and then being separated from the microorganisms.

BACKGROUND OF THE INVENTION

EP-A-233466 discloses a system and a process for the biological purification of waste water, wherein BOD decomposition, nitrification and denitrification are carried out simultaneously in a reactor in which there are microorganisms attached to a carrier. The carrier type is such that the biomass can move freely through the waste water. The purified water and the sludge are then separated in a secondary settling tank, whereafter the sludge is returned to the reactor.

EP-A-24758 discloses a process and a system for oxidative biological purification of waste water, the waste water being passed upwards through an oxidation chamber in which there are microorganisms attached to an insoluble carrier. Separation of the purified waste water and the active sludge takes place at the top of the oxidation chamber, all of the sludge being returned to the oxidation chamber. In this case, both COD purification and nitrification take place.

EP-A-28846 discloses a process for preparing biomass attached to a carrier, the carrier, for example sand, being brought into contact, while being aerated using a sufficient amount of mechanical energy, with a liquid which contains the required microorganisms and nutrients.

A process and an apparatus for aerobic treatment of waste water are known from EP-A-268225. The apparatus is divided in two reaction chambers, one being gas-rich and the other being gas-depleted, and is provided with a settling chamber.

EP-A-399380 discloses an apparatus suitable for denitrification and nitrification of waste water comprising a reactor having an internal vertical division allowing a circulation of the waste water with filling material carrying the biomass. A denitrifying zone is provided in the funnel-shaped bottom part of the reactor.

SUMMARY OF THE INVENTION

The object of the present invention is to provide an improved system and an improved process for biological purification of nitrogenous waste water, in which the nitrogenous components are, as far as possible, nitrified and subsequently denitrified, i.e. converted to nitrogen gas, and by means of which a greater efficiency is achieved than with the conventional systems and processes, while the sludge is separated from the purified waste water continuously and completely and is recirculated.

BRIEF DESCRIPTION OF THE DRAWINGS

The process and the system according to the invention are illustrated in more detail with reference to the accompanying figures, wherein FIG. 1 depicts a system according to the invention.

FIG. 2 depicts an alternative system according to the present invention.

FIG. 3 is an exploded view of the adjustable valve depicted in FIG. 2.

DETAILED DESCRIPTION OF THE INVENTION

The system (apparatus) according to the invention comprises at least two reactor chambers (1) and (2) which are essentially separated by a vertical wall (3), a liquid supply (4) and a liquid discharge (5), the first reactor chamber (1) being provided at the top with an overflow (6) to the second reactor chamber (2), the second reactor chamber (2) being divided at the top into a degassing chamber (7) and a settling chamber (8), which settling chamber is provided with an overflow (9) to the liquid discharge (5), the second reactor chamber (2) being provided at the bottom with one or more passages (10) for recycling liquid from the second reactor chamber (2) to the first reactor chamber (1), and the first reactor chamber (1) being provided with a gas supply (11) and/or (18) and a gas discharge (12) located—above the supply.

An example of the system according to the invention is depicted in FIG. 1. The reactor chamber (1) can be provided with an oxygen-containing gas by means of the gas supply (11) and, as a result, forms an oxygen-rich chamber. The reactor chamber (2), owing to de-aeration in the gas discharge (12) and degassing chamber (7), forms an oxygen-depleted chamber. During use of the system, circulation will take place as a result of the gas flow, an upward flow prevailing in the first reactor chamber and a downward flow prevailing in the second reactor chamber. The main difference between the system according to the invention and the system disclosed by EP-A-24758 is the presence of the second reactor chamber suitable for denitrification.

Preferably, the first reactor chamber (1) is divided by a vertical wall (13) into a reactor chamber (14) and a reactor chamber (15), the reactor chambers (14) and (15) being connected to each other at the top and at the bottom, and the gas supply (11) being situated to one side of the wall (13) so that supplied gas flows upwards essentially only to one side of the wall. The vertical wall may have the form of a pipe which partly divides the reactor chamber (1) into riser section (14) and downcomer section (15). As a result of the relative positions of the gas supply (11) and the wall (13), circulation will arise within the first reactor chamber during operation of the system.

The liquid supply (4) may be connected to the second reactor chamber (2) at different sites, for example at the upper part of the chamber, specifically below the settling chamber (8).

Furthermore, the passage (10), or each passage if more than one passage is used, is preferably provided with one or more nozzles (18) for injecting a fluid into the passage(s) (10). Preferably, the fluid is s gas, for example air.

The passages (10) preferably consist of return lines (17) which enter the first reactor chamber (1) at a higher position than the bottom of the second reactor chamber (2). These return lines (17) are preferably provided with the nozzles (18). The return flow rate through line(s) (17) can be controlled by controlling the gas flow rate through the nozzle(s) (18). Thus, the system is provided with a pump allowing the circulation rate to be increased, and having a capacity comparable to the capacity of the system (mammoth pump). The lines (17) should have a sufficient length for a pumping action. The pumping action does not affect a circulating biomass; biofilms on a carrier for example would be attacked by using a mechanical pump.

Alternatively, the passage(s) (10) may be provided with an adjustable valve (19) which is depicted in FIG. 2, and is shown in more detail in FIG. 3.

In an advantageous embodiment of the system according to the invention, the second reactor chamber (2) is provided at the bottom with one or more gas nozzles (16) as shown in FIG. 1 for unblocking the lower part of the second reactor chamber (2) and/or the passages (10), in case of start-up after an interruption of the operation.

The reactor chambers are preferably cylindrical and essentially concentric, i.e. the chambers (1) and (2), or else the chambers (14), (15) and (2), enclose one another. It is most preferred for the reactor chamber (14) to form the central compartment of the tubular reactor in which the gas supply (11), which is surrounded by the reactor chamber (15), is also situated, while the reactor chamber (2) forms the outermost part of the tubular reactor. In this set-up, both the liquid supply (4) and the liquid discharge (5) can be placed around the reactor. Other arrangements, such as side-by-side placement of chambers (14), (15) and (2), or concentric chambers having a square cross-section are also effective.

The process for purifying waste water, in which the water is treated with microorganisms alternately in an oxygen-depleted chamber and an oxygen-rich chamber, and is then separated from the microorganisms, is characterised by the water being degassed upon passing from the oxygen-rich chamber to the oxygen-depleted chamber, and the microorganisms circulating with a carrier through the oxygen-depleted chamber and the oxygen-rich chamber. The circulation preferably consists of an upward flow in the oxygen-rich chamber and a downward flow in the oxygen-depleted chamber, both the waste water and the microorganisms attached to the carrier being circulated. Preferably, the circulation is maintained at least partly by a return flow using air, from the lower part of the anoxic chamber for example to the upper part of the downward circulation flow in the oxygen-rich chamber (mammoth pump action). Thus the sludge suspension is passed alternately through an oxic (aerated) and anoxic (oxygen-depleted) reactor chamber. In the anoxic chamber, denitrification takes place of the nitrite and nitrate formed in the aerated section.

Carrier materials which can be used include sand, lava, basalt, pumice or activated carbon. The microorganisms attached to the carrier are preferably mixed homogeneously with the water in the oxygen-rich chamber. This is achieved advantageously by a vertical circulation in the oxygen-rich chamber, as a result of supplying an oxygen-containing gas to the oxygen-rich chamber.

The degree of denitrification is determined by the ratio of the return flow rate to the waste water flow rate. The return flow rate is preferably controlled by means of the gas flow rate in the passages (10), especially in the return lines (17). Alternatively, the return flow may be controlled by the passage (10), which is then provided with an adjustable valve (19). The waste water flow rate is controlled by means of a valve in the supply (4). If the ratio return:supply is 3:1, a maximum denitrification of 75% is possible, for example.

In a vertical cylindrical reactor, air is supplied via a supply (11) to a riser (14) in the aerated reactor section (1). Air is retained in the riser, which results in a density difference between the suspension in the riser and the suspension in the downcomer (15). As a result of the density difference, circulating flow of the water/sludge suspension takes place around the riser. This circulating flow ensures optimum mixing and suspension of the sludge on the carrier in the aerated reactor section. The air leaves the reactor chamber (1) via the air discharge (12).

The water/sludge suspension runs via overflow (6) via a degassing chamber (7) into the peripheral anoxic reactor chamber (2). In the degassing chamber, the water/sludge suspension becomes anoxic. The purified waste water leaves the reactor via the settling chamber (8) and the overflow (9). The settled sludge is returned to the anoxic reactor chamber (2). The waste water requiring oxygen is fed into the top of the anoxic reactor chamber, or at another site, via the supply (4), and is mixed with the nitrite— and nitrate-containing water formed in the aerated reactor section. Denitrification takes place in the anoxic reactor chamber. The nitrogen gas produced in the process leaves the anoxic reactor chamber via the degassing chamber (7).

If the passages (10) are aerated return pipes (17) (FIG. 1), their pumping action results in a return flow of the water-sludge mixture from the anoxic reactor chamber (2) to the aerated reactor chamber (1). The return flow rate is controlled through the air flow through the return line(s) (17). In case of blockage of the lower part of the anoxic chamber or the passages (10), e.g. by sludge and/or carrier material during start-up procedures or after an operational stop, nozzles (16) may be fed with a part of the gas normally supplied to the oxic chamber through (11) or even with the entire gas supply, resulting in an upward spread of the blocking material, followed by a restoration of the normal circulation flows.

In the absence of the return lines (17), a pressure difference is produced in the aerated chamber with respect to the anoxic reactor section as a result of air being retained in the aerated reactor section (FIG. 2). This pressure difference gives rise to a return flow of the water-sludge mixture from the anoxic reactor chamber (2) to the aerated reactor chamber (1). The return flow rate is then controlled with sleeve valves or pinch valves (19) in the passages (10). For the purpose of starting up the reactor and of preventing or removing sludge blockages, nozzles may be positioned in the outer wall at the level of the valves through which nozzles treated or untreated waste water can be injected.

The size of the system according to the invention depends, inter alia, on the amount and the composition of the waste water to be treated. The system can be designed for processing, for example, 10–1000 m$^3$ of waste water per hour having a convertible COD loading of 2–8 kg/m$^3$.day and a convertible ammonia-nitrogen loading of 0–2.5 kg N/m$^3$.day. The total reactor volume can be 5–2000 m$^3$. If the system is of cylindrical design, it preferably has a diameter of 1–10 m and a height of 5–25 m. The volume ratio of the aerated to the anoxic reactor section depends inter alia on the ratio of the amount of organic substance to nitrogenous material in the waste water. Preferably, the ratio aerated volume:anoxic volume is between 4:1 and 1:4, especially between 2:1 and 1:1.

Example

Purification of waste water with a denitrifying airlift reactor

Characterisation of waste water: flow rate 28 m$^3$/h; convertible COD concentration 500 mg/l; concentration of ammonium ions: 80 mg N/l.

Reactor according to FIG. 1—dimensions of reactor: height 15 m; diameter 2.44 m; total reactor volume: 70 m$^3$; convertible COD loading 4.8 kg/m$^3$.day; anoxic reactor section 40% of the total reactor volume (=28 m$^3$): aerated reactor section 60% of the total reactor volume (=42 m$^3$); diameter of the aerated reactor section 1.89 m. The support material used is sand, lava, basalt, pumice or activated carbon.

A ratio of input flow rate to recirculation flow rate of 1:4 is maintained. In the aerated section, an air flow rate of 500 Nm$^3$/hour is used. The concentration of dissolved oxygen is approximately 3 mg/l, which is sufficient for complete nitrification. In the anoxic section, the concentration of the dissolved oxygen drops to less than 0.5 mg/l.

The NH$_4^+$ loading of the aerated reactor section is 1.3 kg N/m$^3$.day. There is 100% nitrification. The denitrification capacity of the anoxic reactor section is 1.3 kg N/m$^3$.day. In the reactor, 36.4 kg N/day can be denitrified. The total loading of the anoxic reactor section is 54 kg N/day. Therefore, 67% of the nitrate nitrogen is denitrified. The nitrogen gas production is approximately 1.2 Nm$^3$/hour.

We claim:

1. Apparatus for purifying waste water, comprising a first reactor chamber and a second reactor chamber which are separated over essentially their entire common height by a vertical wall (3), a liquid supply, means for supplying waste water in a downward flow into the second reactor chamber (4) and a liquid discharge (5), the first reactor chamber (1) being provided at the top with an overflow (6) to the second reactor chamber (2), the second reactor chamber (2) being divided at the top into a degassing chamber (7) and a settling chamber (8), said settling chamber being provided with an overflow (9) to the liquid discharge (5), the second reactor chamber (2) being provided at the bottom with at least one passage (10) for recycling liquid from the second reactor chamber (2) to the first reactor chamber (1), and the first reactor chamber (1) being provided with a gas supply for producing an upward flow of waste water in the first reactor chamber (11) and a gas discharge (12) located thereabove.

2. Apparatus according to claim 1, wherein the first reactor chamber (1) is divided by a vertical divider wall (13) into a first partial reactor chamber (14) and a second partial reactor chamber (15), the partial reactor chambers (14) and (15) being fluidly connected to each other at the top and bottom, and the gas supply (11) being situated to one side of the divider wall (13) so that supplied gas flows upwards essentially only to one side of the divider wall.

3. Apparatus according to claim 1, wherein said at least one passage (10) comprises at least one return line (17) which enters the first reactor chamber (1) at a higher position than the bottom of the second reactor chamber (2).

4. Apparatus according to claim 1, wherein said at least one passage (10) is provided with at least one nozzle (18) for injecting a fluid into the passage (10).

5. Apparatus according to claim 1, wherein the second reactor chamber (2) is provided at the bottom with at least one gas nozzle (16) for unblocking the passage (10).

6. Process for purifying waste water, comprising: supplying waste water for biological treatment with microorganisms alternately in a downward flow in an oxygen-depleted chamber and in an upward flow in an oxygen-rich chamber, and the separating the biologically treated water from the microorganisms, the water being degassed upon passing from the oxygen-rich chamber to the oxygen-depleted chamber, and the microorganisms being circulated with a carrier through the oxygen-depleted chamber and the oxygen-rich chamber, wherein the ratio between a return flow from the oxygen-depleted chamber to the oxygen-rich chamber and waste water supply flow can be independently controlled and is selected to be at least 2:1.

7. Process according to claim 6, wherein the microorganisms with the carrier are mixed homogeneously with the water in the oxygen-rich chamber.

8. Process according to claim 7, wherein the water with the microorganisms are circulated vertically within the oxygen-rich chamber.

9. Process according to claim 6, wherein the waste water is supplied to the oxygen-depleted chamber and the treated waste water is discharged at the top from the oxygen-depleted chamber.

10. Process according claim 6, wherein the water with microorganisms is returned from the oxygen-depleted chamber to the oxygen-rich chamber by a mammoth pump action provided by at least one return line in which gas is blown.

* * * * *